United States Patent
Luo et al.

(10) Patent No.: US 10,073,543 B2
(45) Date of Patent: Sep. 11, 2018

(54) IMAGE SEGMENTATION DEVICE AND IMAGE SEGMENTATION METHOD

(71) Applicant: HTC Corporation, Taoyuan (TW)

(72) Inventors: Sheng-Jie Luo, Taoyuan (TW); Liang-Kang Huang, Taoyuan (TW); Tzu-Hao Kuo, Taoyuan (TW); Tung-Peng Wu, Taoyuan (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 14/619,047

(22) Filed: Feb. 10, 2015

(65) Prior Publication Data

US 2015/0253880 A1    Sep. 10, 2015

Related U.S. Application Data

(60) Provisional application No. 61/949,366, filed on Mar. 7, 2014.

(51) Int. Cl.
*G06F 3/041* (2006.01)
*G06F 3/0354* (2013.01)
*G06K 9/46* (2006.01)
*G06K 9/00* (2006.01)
*G06K 9/20* (2006.01)
*G06T 7/11* (2017.01)

(52) U.S. Cl.
CPC ..... *G06F 3/03545* (2013.01); *G06K 9/00409* (2013.01); *G06K 9/2081* (2013.01); *G06K 9/46* (2013.01); *G06T 7/11* (2017.01); *G06K 2009/4666* (2013.01); *G06T 2200/24* (2013.01); *G06T 2207/20096* (2013.01)

(58) Field of Classification Search
None
See application file for complete search history.

(56) References Cited

U.S. PATENT DOCUMENTS

| | | | |
|---|---|---|---|
| 2003/0072487 A1* | 4/2003 | Fan | G06T 7/0081 382/176 |
| 2010/0007675 A1* | 1/2010 | Kang | G06F 3/04883 345/592 |
| 2011/0286672 A1 | 11/2011 | Yamanaka | |
| 2013/0009989 A1* | 1/2013 | Chen | G06F 3/0488 345/629 |

(Continued)

FOREIGN PATENT DOCUMENTS

| | | |
|---|---|---|
| CN | 101404085 A | 4/2009 |
| CN | 101702236 A | 5/2010 |

(Continued)

OTHER PUBLICATIONS

Corresponding Taiwanese Office Action that these art references were cited on Feb. 23, 2016.
Corresponding Chinese office action dated Mar. 24, 2017.

*Primary Examiner* — Ifedayo Iluyomade
(74) *Attorney, Agent, or Firm* — CKC & Partners Co., Ltd.

(57) ABSTRACT

An image segmentation method includes displaying, through a display component, an original designation region relative to an image; receiving a user input on the image, in which the user input is at least one stroke on the image; segmenting a regional area corresponding to the stroke to update the original designation region, in which the regional area at least partially overlaps with the original designation region.

7 Claims, 7 Drawing Sheets

(56) References Cited

U.S. PATENT DOCUMENTS

2014/0254919 A1* 9/2014 Sun ...................... G06K 9/3233
            382/154

FOREIGN PATENT DOCUMENTS

| CN | 102707864 A | 10/2012 |
| CN | 103559719 A | 2/2014 |
| TW | 201030679 A | 8/2010 |
| TW | 201303788 A | 1/2013 |
| TW | 201349093 A | 12/2013 |

* cited by examiner

IMAGE SEGMENTATION DEVICE AND IMAGE SEGMENTATION METHOD

RELATED APPLICATIONS

This application claims priority to U.S. Provisional Application Ser. No. 61/949,366, filed Mar. 7, 2014, which is herein incorporated by reference.

BACKGROUND

Technical Field

The present disclosure relates to an electronic device and a method. More particularly, the present disclosure relates to an image segmentation device and an image segmentation method.

Description of Related Art

With advances in image processing technology, image segmentation methods have been widely used.

A typical image segmentation method may be used to segment different portions of an image. For example, in digital photography, an image segmentation method can be used to segment out a main object (i.e., a foreground) from a background of the image. With such an operation, the main object and the background can be processed separately.

SUMMARY

One aspect of the present disclosure is related to an image segmentation method. In accordance with one embodiment of the present disclosure, the image segmentation method includes displaying, through a display component, an original designation region relative to an image; receiving a user input on the image, in which the user input is at least one stroke on the image; segmenting a regional area corresponding to the stroke to update the original designation region, in which the regional area at least partially overlaps with the original designation region.

In accordance with one embodiment of the present disclosure, the image comprises a plurality of pixels, and the regional area is extended from pixels passed by the stroke for an extended width.

In accordance with one embodiment of the present disclosure, the extended width corresponds to the length of the stroke.

In accordance with one embodiment of the present disclosure, the step of segmenting the regional area corresponding to the stroke to update the original designation region includes calculating the extended width according to the stroke and the original designation region, so as to cause the regional area to at least partially overlap with the original designation region.

In accordance with one embodiment of the present disclosure, the step of segmenting the regional area corresponding to the stroke to update the original designation region includes determining the regional area corresponding to the stroke; generating a plurality of seeds corresponding to the stroke, the regional area, and the original designation region; and segmenting the regional area according to the seeds to update the original designation region to generate an updated designation region.

In accordance with one embodiment of the present disclosure, the step of updating the original designation region according to the seeds includes performing an image segmentation algorithm within the regional area according to foreground seeds and background seeds from among the seeds and the image to update the original designation region.

In accordance with one embodiment of the present disclosure, all of pixels passed by the stroke are either within the updated designation region or outside the updated designation region according to whether the stroke is a background stroke or a foreground stroke.

In accordance with one embodiment of the present disclosure, at least one pixel passed by the stroke and at least one pixel located around the regional area are taken as the seeds.

In accordance with one embodiment of the present disclosure, pixels around the regional area are taken as foreground seeds or background seeds according to whether the original designation region is used to select a foreground or a background of the image.

In accordance with one embodiment of the present disclosure, pixels passed by the stroke are taken as foreground seeds or background seeds according to whether the stroke is a foreground stroke or a background stroke.

Another aspect of the present disclosure relates to an image segmentation device. In accordance with one embodiment of the present disclosure, the image segmentation device includes a display component, a user input interface, and a processing component. The display component is configured for displaying an original designation region relative to an image. The user input interface is configured for receiving a user input on the image, in which the user input is at least one stroke on the image. The processing component is configured for segmenting a regional area corresponding to the stroke to update the original designation region, in which the regional area at least partially overlaps with the original designation region.

In accordance with one embodiment of the present disclosure, the image comprises a plurality of pixels, and the regional area is extended from pixels passed by the stroke for an extended width.

In accordance with one embodiment of the present disclosure, the extended width corresponds to the length of the stroke.

In accordance with one embodiment of the present disclosure, the processing component is further configured for calculating the extended width according to the stroke and the original designation region, so as to cause the regional area to at least partially overlap with the original designation region.

In accordance with one embodiment of the present disclosure, the processing component is further configured for determining the regional area corresponding to the stroke; generating a plurality of seeds corresponding to the stroke, the regional area, and the original designation region; and segmenting the regional area according to the seeds to update the original designation region to generate an updated designation region.

In accordance with one embodiment of the present disclosure, the processing component is further configured for performing an image segmentation algorithm within the regional area according to foreground seeds and background seeds from among the seeds and the image to update the original designation region.

In accordance with one embodiment of the present disclosure, all of pixels passed by the stroke are either within the updated designation region or outside the updated designation region according to whether the stroke is a background stroke or a foreground stroke.

In accordance with one embodiment of the present disclosure, at least one pixel passed by the stroke and at least one pixel located around the regional area are taken as the seeds.

In accordance with one embodiment of the present disclosure, pixels around the regional area are taken as foreground seeds or background seeds according to whether the original designation region is used to select a foreground or a background of the image.

In accordance with one embodiment of the present disclosure, pixels passed by the stroke are taken as foreground seeds or background seeds according to whether the stroke is a foreground stroke or a background stroke.

Through an application of one embodiment described above, the original designation region can be adjusted within a regional area corresponding to the stroke. With such an operation, precise image segmentation can be realized.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. § 112(f).

One aspect of the present disclosure is related to an image segmentation device. In the paragraphs below, a smart phone or a tablet computer will be taken as an example to describe details of the image segmentation device. However, the present disclosure is not limited in this regard.

Figure 1:
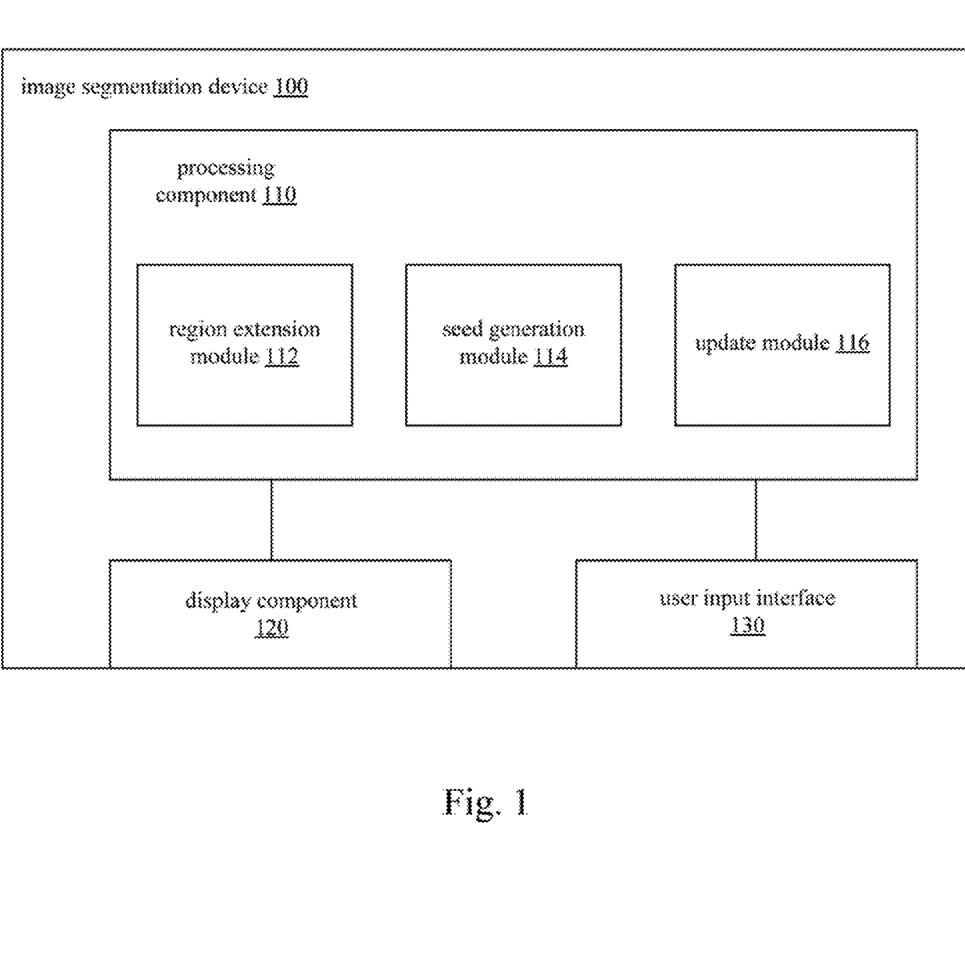
FIG. 1 is a schematic diagram of an image segmentation device in accordance with one embodiment of the present disclosure.

FIG. 1 is a schematic diagram of an image segmentation device 100 in accordance with one embodiment of the present disclosure. In this embodiment, the image segmentation device 100 includes a processing component 110, a display component 120, and a user input interface 130. In one embodiment, the processing component 110 is electrically connected to the display component 120 and the user input interface 130.

In one embodiment, the processing component 110 can be realized by, for example, a processor, such as a central processor, a microprocessor, or a digital signal processor (DSP), but is not limited in this regard. The display component 120 can be realized by, for example, a display, such as a liquid crystal display, an active matrix organic light emitting display (AMOLED), or an e-paper display, but is not limited in this regard. The user input interface 130 can be realized by, for example, a touch sensing module, a keyboard, or a mouse, but is not limited in this regard. In one embodiment, the display component 120 and the user input interface 130 can be integrated as a touch display component, but the present disclosure is not limited to such an embodiment.

In one embodiment, the display component 120 is configured to display an image and an original designation region. The user input interface 130 is configured to receive an input by a user relative to the image and the original designation region. The processing component 110 is configured to segment a regional area corresponding to the input to update the original designation region.

Details of the present disclosure are described in the paragraphs below with reference to an image segmentation method in FIG. 2. However, the present disclosure is not limited to the embodiment below.

It should be noted that the image segmentation method can be applied to an image segmentation device having a structure that is the same as or similar to the structure of the image segmentation device 100 shown in FIG. 1. To simplify the description below, in the following paragraphs, the embodiment shown in FIG. 1 will be used as an example to describe the image segmentation method according to an embodiment of the present disclosure. However, the present disclosure is not limited to application to the embodiment shown in FIG. 1.

In addition, it should be noted that in the steps of the following image segmentation method, no particular sequence is required unless otherwise specified. Moreover, the following steps also may be performed simultaneously or the execution times thereof may at least partially overlap.

Furthermore, the steps of the following image segmentation method may be added to, replaced, and/or eliminated as appropriate, in accordance with various embodiments of the present disclosure.

Figure 2:
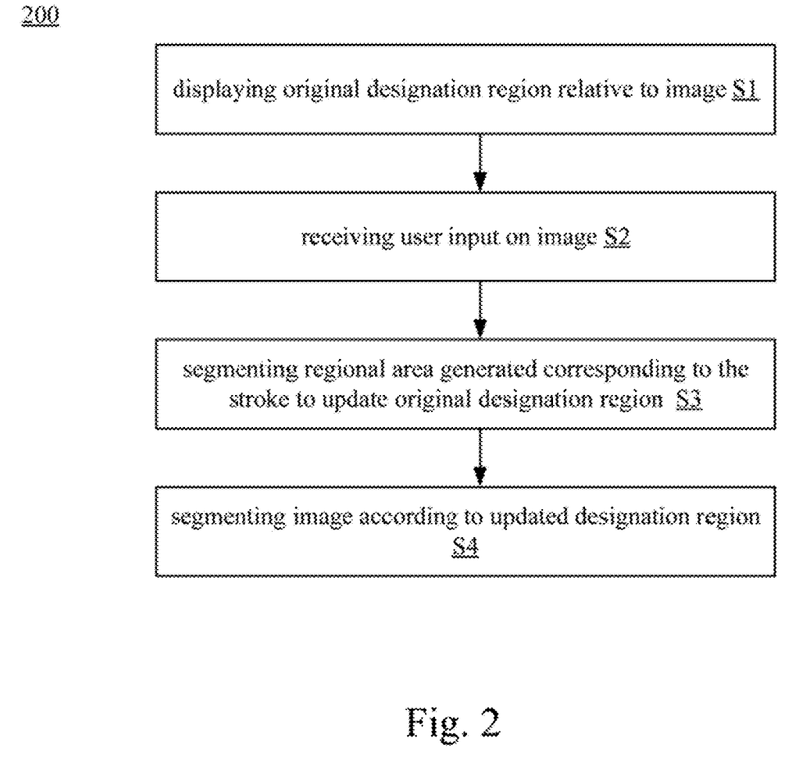
FIG. 2 is a flowchart of an image segmentation method in accordance with one embodiment of the present disclosure.

Reference is made to FIG. 2. The image segmentation method 200 includes the steps below.

In step S1, the processing component 110 utilizes the display component 120 to display an original designation region relative to an image. In one embodiment, the original designation region may be designated by a user or generated by performing a preliminary image segmenting process on the image, but is not limited in this regard. In one embodiment, the image includes a plurality of pixels, and the original designation region selects a first portion of the pixels of the image. In one embodiment, the original designation region may be used to select a foreground of the image. However, in another embodiment, the original designation region may be used to select a background of the image.

In step S2, the processing component 110 utilizes the user input interface 120 to receive an input provided by a user on the image. In one embodiment, the input may be at least one stroke (e.g., a straight line, a curve, or a dot), but is not limited in this regard. In order to simplify the description, a stroke will be taken as a descriptive example in the paragraphs below, but the disclosure is not limited to such an embodiment.

In one embodiment the user may provide the stroke by using a finger, a stylus, a mouse, or a keyboard, but the disclosure is not limited in this regard. In one embodiment, the stroke may be provided on at least one of the pixels of the image.

In step S3, the processing component 110 segments a regional area which is generated corresponding to the stroke to update the original designation region to generate an updated designation region, and controls the display component 120 to display the updated designation region. In this embodiment, the segmenting is limited within the regional area corresponding to the stroke, in which the regional area is smaller than the image, such that the original designation region can be adjusted regionally. In one embodiment, the regional area is located around the stroke. In one embodiment, the processing component 110 segments the regional area according to a part of the image (e.g., the colors of the part of the image) within the regional area. In one embodiment, the regional area at least partially overlaps with the original designation region. In one embodiment, the updated designation region selects a second portion of the pixels of the image. In one embodiment, an image segmentation algorithm may be applied within the regional area according to the stroke, so as to update the original designation region.

In step S4, after the updated designation region is generated, the processing component 110 segments the image according to the updated designation region. In one embodiment, the processing component 110 may segment out the image selected by the updated designation region to obtain at least one segmented region. In one embodiment, the at least one segmented region may serve as a foreground of the image, and the remaining region may serve as a background of the image. In a different embodiment, the at least one segmented region may serve as a background of the image, and the remaining region may serve as a foreground of the image.

It should be noted that, in some embodiments, step S4 may be omitted, and the processing component 110 may update the updated designation region again (or iteratively) according to a new input provide by the user before the image is segmented.

In some approaches, a stroke may affect the entire original designation region. In this case, it is not possible to adjust the original designation region precisely, causing inconvenience to a user. Additionally, in such a case, segmenting the entire image is computationally expensive.

However, with the operations in one embodiment of the present disclosure described above, the original designation region can be adjusted regionally, such that precise image segmentation can be realized. In addition, with the operations in one embodiment of the present disclosure, only the regional area is needed to be segmented, such that the computation of the segmenting can be decreased.

To allow the disclosure to be more fully understood, an operative example is described in the paragraphs below, but the present disclosure is not limited to the example below.

Figure 3A:
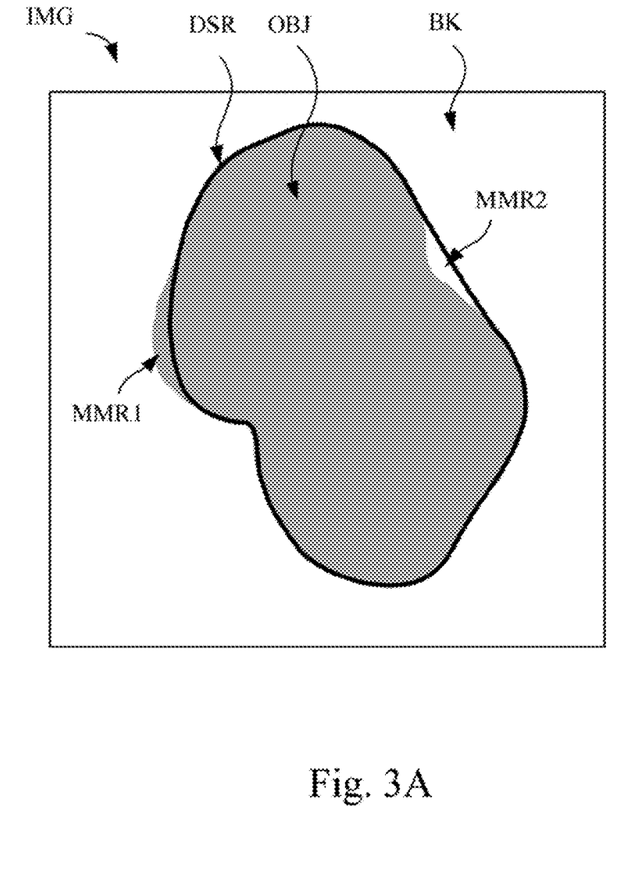
FIGS. 3A and 3B illustrate an operative example of an image segmentation method in accordance with one embodiment of the present disclosure.
Figure 3B:
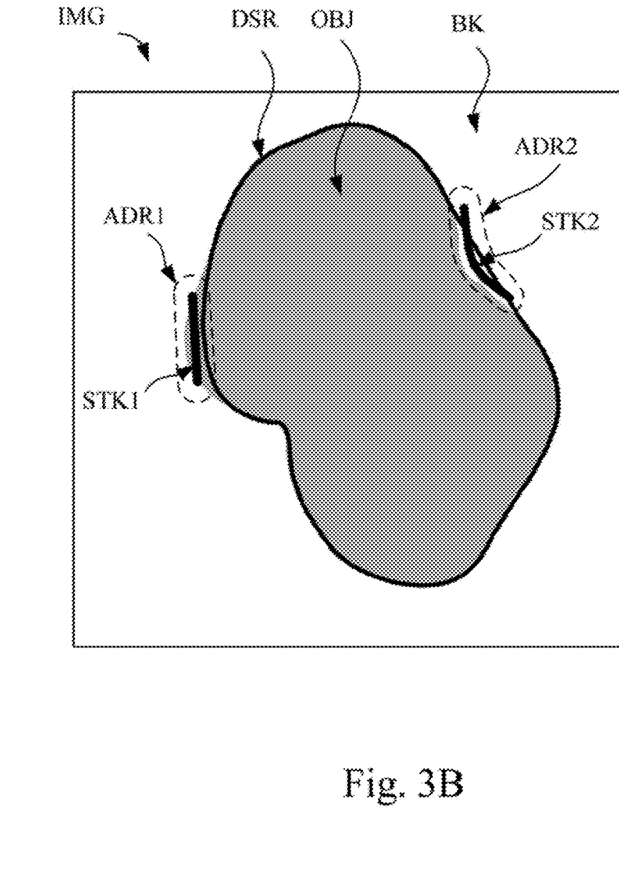

Reference is made to FIGS. 3A and 3B. In this embodiment, an image IMG may be presented on the display component 120. The image IMG has a background BK and an object (i.e., a foreground) OBJ, in which the object OBJ is shown by the gray area in the image IMG. An original designation region DSR is presented on the image IMG, in which a boundary of the original designation region DSR is indicated as the bold line in the image IMG and is substantially located between the object OBJ and background BK of the image IMG.

There are two mismatch regions MMR1 MMR2 between the object OBJ and the original designation region DSR, in which the mismatch region MMR1 is a portion of the object OBJ not covered by the original designation region DSR, and the mismatch region MMR2 is a portion of background BK of the image IMG which is inappropriately covered by the original designation region DSR.

In this case, a user may draw a foreground stroke STK1 on the mismatch region MMR1 to adjust (i.e. to increase) the original designation region DSR within a regional area ADR1 around the stroke STK1 and to thereby generate a first updated designation region. Subsequently, the user may draw a background stroke STK2 on the mismatch region MMR2 to adjust (i.e., to decrease) the first updated designation region within a regional area ADR2 around the stroke STK2 and to thereby generate a second updated designation region. Through such an operation, the original designation region can be adjusted regionally.

In one embodiment, when the adjusting of the original designation region DSR corresponding to the stroke STK1 is finished, the display component 120 stops displaying the stroke STK1, so that the user can draw the stroke STK2 without interference of the stroke STK1, but the present disclosure is not limited in this regard. In one embodiment, the adjusting corresponding to the stroke STK2 is relevant only the image IMG, the stroke STK2, and the first updated designation region, and is irrelevant to the previous stroke STK1, but the present disclosure is not limited in this regard.

Figure 4:
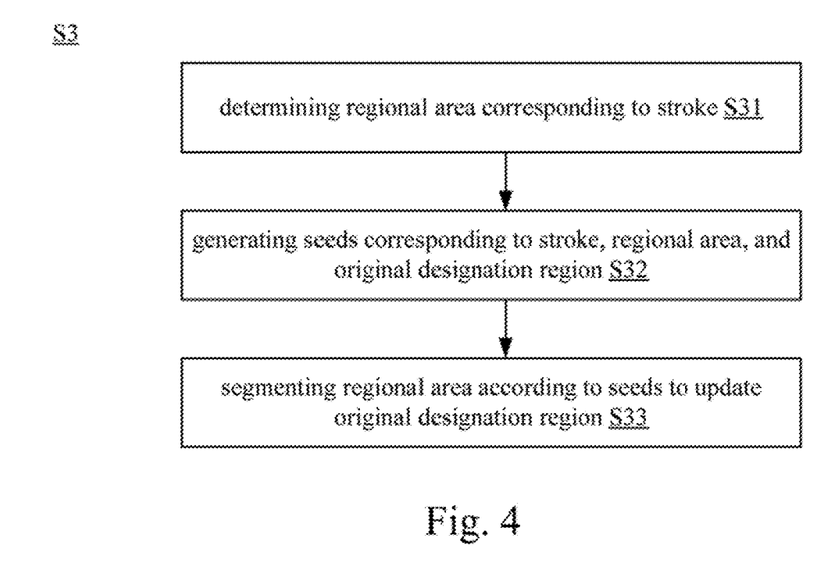
FIG. 4 illustrates sub-steps of one step in the image segmentation method in FIG. 2 in accordance with one embodiment of the present disclosure.

Reference is now made to FIG. 4, which illustrates sub-steps S31-S33 of step S3 in the image segmentation method 200 in accordance with one embodiment of the present disclosure.

In step S31, the processing component 110 determines the regional area corresponding to the stroke. In one embodiment, the regional area is extended from the pixels passed by the stroke for w pixels, where w is an integer. In one embodiment, w corresponds to the length of the stroke. The longer the stroke, the greater the value of w, and vice versa. Through such operation, the user can adjust the original designation region by a large amount with a long stroke, and adjust the original designation region by a small amount with a short stroke or a dot. Additionally, in another embodiment, the processing component 110 can calculate the extended width w according to the stroke and the original designation region, so as to cause the regional area to at least partially overlap with the original designation region. In still another embodiment, the extended width w may be a predetermined value.

In step S32, after the regional area is determined, the processing component 110 generates a plurality of seeds corresponding to the stroke, the regional area, and the original designation region. In one embodiment, the pixels passed by the stroke and the pixels around the regional area may be taken as the seeds.

In one embodiment, the seeds include foreground seeds and background seeds. The pixels passed by the stroke are taken as foreground seeds or background seeds according to whether the stroke is a foreground stroke or a background stroke. For example, when the stroke is a background stroke, the pixels passed by the background stroke are taken as the background seeds. When the stroke is a foreground stroke, the pixels passed by the foreground stroke are taken as the foreground seeds.

In addition, the pixels around the regional area and within the original designation region are taken as the foreground seeds or the background seeds according to whether the original designation region is used to select a foreground or a background of the image. Also, the pixels around the regional area and outside the original designation region are taken as the foreground seeds or the background seeds according to whether the original designation region is used to select a foreground or a background of the image.

For example, when the original designation region is used to select a foreground of the image, the pixels around the regional area and within the original designation region are taken as the foreground seeds, and the pixels around the regional area and outside the original designation region are taken as the background seeds. When the original designation region is used to select a background of the image, the pixels around the regional area and within the original designation region are taken as the background seeds, and the pixels around the regional area and outside the original designation region are taken as the foreground seeds.

In step S33, after the seeds are generated, the processing component 110 segments the regional area according to the seeds to update the original designation region to generate an updated designation region. In one embodiment, the processing component 110 performs an image segmentation algorithm within the regional area according to the background seeds, the foreground seeds, and a part of the image (e.g. the colors of the part of the image) within the regional area to update the original designation region. In one embodiment, the image segmentation algorithm may be a graph cut algorithm, but is not limited in this regard. It should be noted that the graph cut algorithm is configured to receive foreground and background seeds provided by a user, in order to select a foreground or a background of an image according to the color of the image and the foreground and background seeds. Thus, by performing the graph cut algorithm, a foreground or a background of the image in the regional area can be determined.

In one embodiment, all of the pixels passed by the stroke are either within the updated designation region or outside the updated designation region according to the whether the stroke is a background stroke or a foreground stroke and whether the updated designation region is used to select a foreground of the image or a background of the image.

For example, when the stroke is a background stroke and the updated designation region is used to select a foreground of the image, all of the pixels passed by the background stroke are outside the updated designation region. When the stroke is a background stroke and the updated designation region is used to select a background of the image, all of the pixels passed by the background stroke are inside the updated designation region. When the stroke is a foreground stroke and the updated designation region is used to select a foreground of the image, all of the pixels passed by the background stroke are within the updated designation region. When the stroke is a foreground stroke and the updated designation region is used to select a background of the image, all of the pixels passed by the background stroke are outside the updated designation region.

In one embodiment, the determination of the regional area (i.e., the operation in step S31) can be performed by a region extension module 112 in the processing component 110, the generation of the seeds (i.e., the operation in step S32) can be performed by a seed generation module 114 in the processing component 110, and the update of the original designation region (i.e., the operation in step S33) can be performed by an update module 116 in the processing component 110, but the present disclosure is not limited to such an embodiment.

To allow the disclosure to be more fully understood, an operative example is described in the paragraphs below, but the present disclosure is not limited to the example below.

Figure 5A:
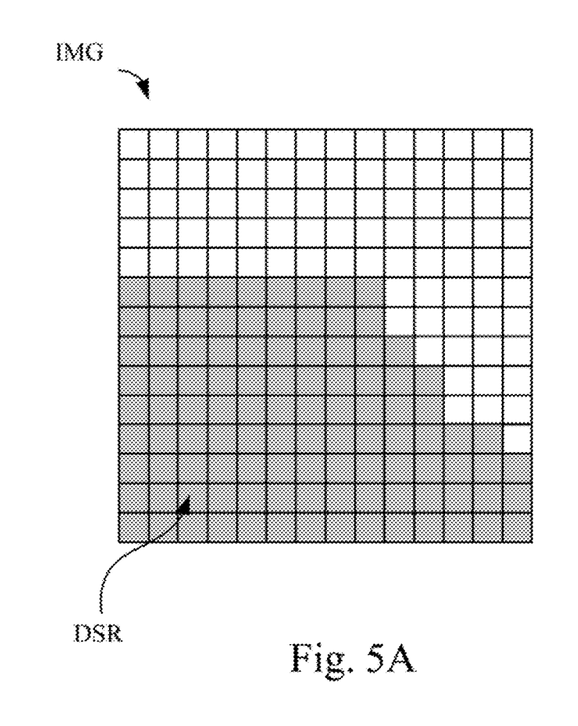
FIGS. 5A-5E illustrate another operative example of an image segmentation method in accordance with one embodiment of the present disclosure.
Figure 5B:
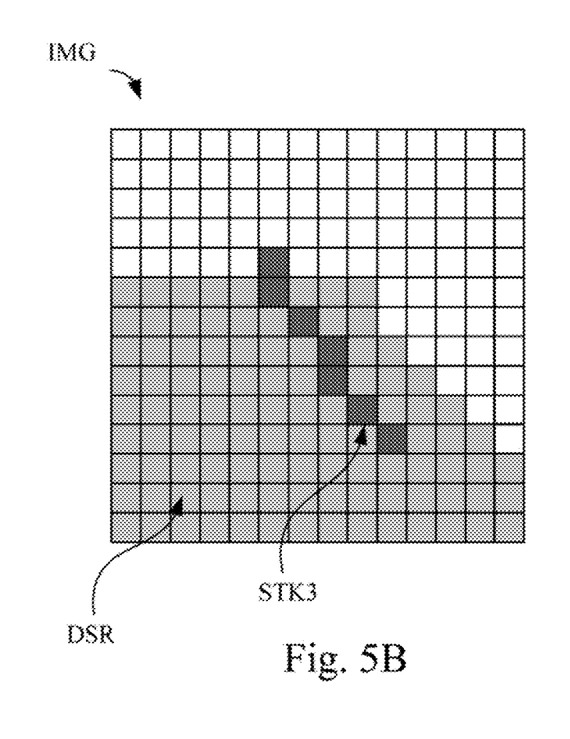
Figure 5C:
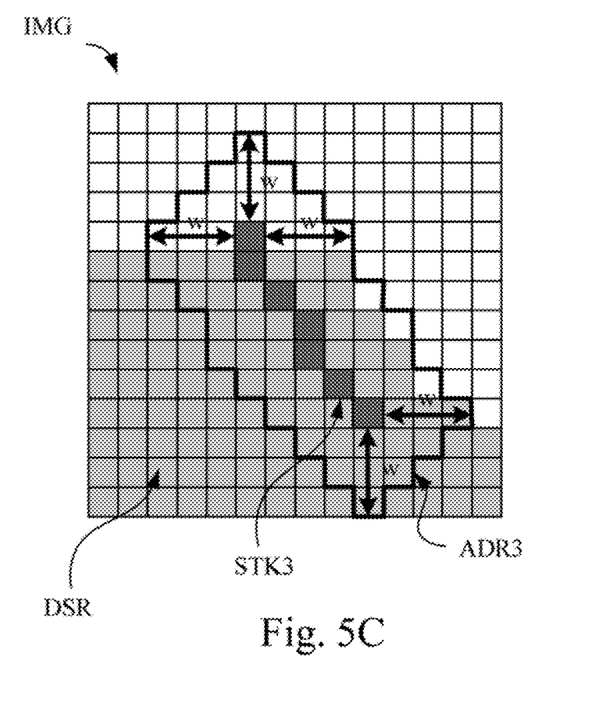
Figure 5D:
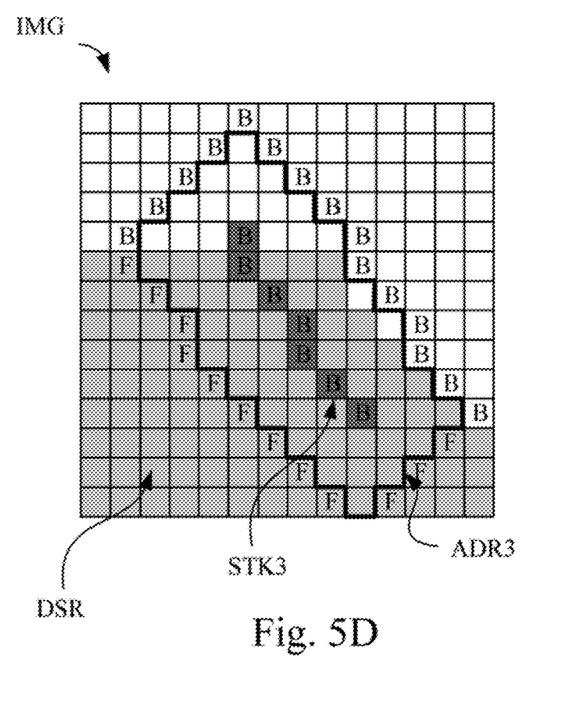
Figure 5E:
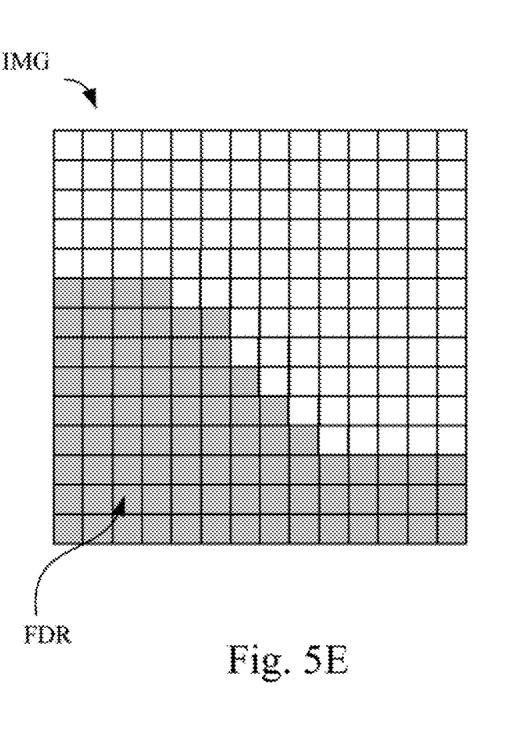

Reference is made to FIGS. 5A and 5E. Initially, an original designation region DSR is presented on the image IMG as shown in FIG. 5A. Subsequently, a stroke STK3 may be provided on the image IMG as shown in FIG. 5B.

Next, a regional area ADR3 may be determined around the stroke STK3, in which the regional area ADR3 is extended from the pixels passed by the stroke STK3 for w pixels as shown in FIG. 5C. In this case, w is equal to 3.

Next, background seeds (labeled "B") and foreground seeds (labeled "F") may be generated according to the stroke STK3 and the regional area ADR3 as shown in FIG. 5D. In this case, since the stroke STK3 is a background stroke and the original designation region DSR is used to select a foreground of the image IMG, the pixels passed by the stroke STK3 are taken as the background seeds, the pixels around the regional area ADR3 and within the original designation region DSR are taken as the foreground seeds, and the pixels around the regional area ADR3 and outside the original designation region DSR are taken as the background seeds.

Subsequently, according to the foreground seeds and the background seeds and the image IMG, a portion of the original designation region DSR within the regional area ADR3 can be adjusted, such that an updated designation region FDR can be generated as shown in FIG. 5E. It should be noted that the pixels passed by the stroke STK3 are excluded from the updated designation region FDR. In other words, the regional area ADR3 is segmented according to the foreground seeds and the background seeds and the image IMG to update the original designation region DSR to generate the updated designation region FDR shown in FIG. 5E.

Through such an operation, the original designation region can be adjusted regionally, such that precise image segmentation can be realized.

Although the present invention has been described in considerable detail with reference to certain embodiments thereof, other embodiments are possible. Therefore, the scope of the appended claims should not be limited to the description of the embodiments contained herein.

What is claimed is:

1. An image segmentation method comprising:
   displaying, through a display component, an original designation region relative to an image, wherein the image comprises a plurality of pixels;
   after the original designation region is displayed, sensing a stroke on the image, wherein the stroke passes through a plurality of pixels of the image;
   after the stroke on the image is sensed, determining a regional area according to stroke information corresponding to the stroke on the image, wherein the regional area at least partially overlaps with the original designation region:
   generating a plurality of seeds corresponding to the stroke, the regional area, and the original designation region, wherein the seeds comprise foreground seeds and background seeds; if the stroke is a background stroke, the pixels passed by the background stroke are the background seeds; if the stroke is a foreground stroke, the pixels passed by the foreground stroke are the foreground seeds; if the original designation region is used to select a foreground, the pixels around the regional area and within the original designation region are the foreground seeds, and the pixels around the regional area and outside the original designation region are the background seeds; if the original designation region is used to select a background, the pixels around the regional area and within the original designation region are the background seeds, and the pixels around the regional area and outside the original designation region are the foreground seeds; and the pixels in the regional area not passed by the stroke are not classified as the foreground seeds or the background seeds;
   performing a segmentation within the regional area according to the seeds to update the original designation region;
   wherein under a first condition, the segmentation within the regional area is performed to increase an area of the original designation region within the regional area, and wherein under a second condition, the segmentation within the regional area is performed to decrease the area of the original designation region within the regional area; and
   wherein the regional area is determined according to the stroke by extending the regional area from the pixels passed by the stroke for w pixels, wherein w is an integer and is directly proportional to a length of the stroke.

2. The image segmentation method as claimed in claim 1, wherein the segmentation is a graph cut algorithm and is performed according to the seeds.

3. The image segmentation method as claimed in claim 1, wherein all of pixels passed by the stroke are either within the updated designation region or outside the updated designation region according to whether the stroke is the background stroke or the foreground stroke.

4. An image segmentation device comprising:
   a display component configured for displaying an original designation region relative to an image, wherein the image comprises a plurality of pixels;
   a user input interface configured for sensing a stroke on the image after the original designation region is displayed, wherein the stroke passes through a plurality of pixels of the image; and
   a processing component configured for:
   determining a regional area according to stroke information corresponding to the stroke on the image, wherein the regional area at least partially overlaps with the original designation region;
   generating a plurality of seeds corresponding to the stroke, the regional area, and the original designation region, wherein the seeds comprise foreground seeds and background seeds; if the stroke is a background stroke, the pixels passed by the background stroke are the background seeds: if the stroke is a foreground stroke, the pixels passed by the foreground stroke are the foreground seeds; if the original designation region is used to select a foreground, the pixels around the regional area and within the original designation region are the foreground seeds, and the pixels around the regional area and outside the original designation region are the background seeds; if the original designation region is used to select a background, the pixels around the regional area and within the original designation region are the background seeds, and the pixels around the regional area and outside the original designation region are the foreground seeds: and the pixels in the regional area not passed by the stroke are not classified as the foreground seeds or the background seeds;
   performing a segmentation within the regional area according to the seeds to update the original designation region,
   wherein under a first condition, the segmentation within the regional area is performed to increase an area of the original designation region within the regional area,
   wherein under a second condition, the segmentation within the regional area is performed to decrease the area of the original designation region within the regional area,
   wherein the regional area is determined according to the stroke by extending the regional area from the pixels passed by the stroke for w pixels, wherein w is an integer and is directly proportional to a length of the stroke.

5. The image segmentation device as claimed in claim 4, wherein the segmentation is a graph cut algorithm and is performed according to the seeds.

6. The image segmentation device as claimed in claim 4, wherein all of pixels passed by the stroke are either within the updated designation region or outside the updated designation region according to whether the stroke is the background stroke or the foreground stroke.

7. An image segmentation method comprising: displaying, through a display component, an original designation region relative to an image, wherein the image comprises a plurality of pixels; sensing a stroke on the image; determining a regional area according to stroke information corresponding to the stroke on the image, wherein the original designation region at least partially overlaps with the regional area; and generating a plurality of seeds corresponding to the stroke, the regional area, and the original designation region, wherein the seeds comprise foreground seeds and background seeds; if the stroke is a background stroke, the pixels passed by the background stroke are the background seeds; if the stroke is a foreground stroke, the pixels passed by the foreground stroke are the foreground seeds; if the original designation region is used to select a foreground, the pixels around the regional area and within the original designation region are the foreground seeds, and the pixels around the regional area and outside the original designation region are the background seeds; if the original designation region is used to select a background, the pixels around the regional area and within the original designation region are the background seeds, and the pixels around the regional area and outside the original designation region are the foreground seeds, and the pixels in the regional area not passed by the stroke are not classified as the foreground seeds or the background seeds; performing a segmentation within the regional area according to the seeds to update a contour of the original designation region within the regional area to generate an updated designation region, wherein a portion of pixels in the regional area are located inside the updated designation region, while another portion of pixels in the regional area are located outside the updated designation region.

\* \* \* \* \*